United States Patent Office 2,956,071
Patented Oct. 11, 1960

2,956,071

ORGANO-METALLIC ZIRCONIUM COMPOUNDS AND METHOD OF MAKING THE SAME

Carlos M. Samour, Brighton, Mass., assignor to The Kendall Company, Boston, Mass., a corporation of Massachusetts No Drawing. Filed May 24, 1957, Ser. No. 661,285

17 Claims. (Cl. 260—429.3)

This invention relates to new organo-metallic zirconium compounds and pertains more specifically to monomeric solid organo-metallic zirconium compounds having a cyclic structure in which a single zirconium atom forms a part of each of two heterocyclic rings, and low addition polymers thereof.

Although esters of orthozirconic acid with alcohols have been previously known, these materials are relatively unstable, particularly those made from lower molecular weight alcohols, tending to hydrolyze with polymerization to form condensation polymers in the presence of even minute quantities of water. Many of these esters in their monomeric form are so sensitive to water that they cannot be left exposed to the atmosphere for any appreciable length of time without undergoing decomposition and/or condensation polymerization to a substantial extent, resulting in materials characterized by a chain of alternating oxygen and zirconium atoms, frequently relatively insoluble. Such condensation polymers possess an elemental analysis different from that of their corresponding monomers.

The compounds of the present invention which may be considered to be monomeric cyclic esters and monomeric cyclic mixed anhydrides are solid materials which are easily handled and which, because of their solid nature, may be obtained in highly purified form. Moreover, these new materials are more stable to water, particularly to water in the form of atmospheric moisture, than are the esters previously known. By the term "monomeric" is meant a compound containing only a single zirconium atom in each molecule, as distinguished from polymers containing two or more zirconium atoms bonded into a single molecule with primary valence bonds. By the term "low addition polymers" is meant polymers having the same elemental composition as the corresponding monomeric materials in which the average degree of polymerization (i.e., the average total number of zirconium atoms per molecule) is no greater than five. These low addition polymers are equivalent to the monomeric materials for many purposes.

All of the compounds of the present invention contain on the average from one to five zirconium atoms in the molecule and have at least two heterocyclic rings with each zirconium atom forming a part of two adjacent rings, each ring consisting, in addition to zirconium, of —O—A—O— groups in which each oxygen atom is bonded directly to zirconium by a primary valence bond and A is a group containing from two to three aliphatic carbon atoms in the chain connecting the oxygen atoms, the number of —O—A—O— groups in the molecule being twice the number of zirconium atoms.

In the monomeric compounds of the present invention, a single zirconium atom forms a part of each of two heterocyclic rings, each ring containing from five to six atoms, of which the two adjacent the zirconium atom are oxygen and the remaining atoms of the ring are aliphatic carbon atoms. Although all four of the primary valences of the zirconium atom are satisfied in such compounds, there remain four potential secondary valences (since the maximum coordination number of zirconium is eight) which enable the compounds to chelate internally if there are any unreacted chelating (donor) groups such as hydroxyl, nitrile, ester, or amino groups present in the molecule, e.g., as substituents on the ring carbon atoms, and which are geometrically situated so that the chelating groups can interact with the zirconium. These secondary valences also make it possible for two or more molecules to associate with each other when they contain such unreacted donor groups or to associate with other materials containing such groups.

The cyclic esters of the present invention may be prepared by an ester interchange reaction in which one mole of a tetraalkyl zirconate is reacted with two moles of a polyhydroxy alcohol under anhydrous conditions. In some cases it may be advantageous to carry out the reaction in the presence of a volatile solvent or diluent; a solvent inert to the reactants may be used, e.g., benzene, xylene, hexane or other hydrocarbon, halogenated hydrocarbons such as chloroform or ethylene dichloride; or a monohydric alcohol more volatile than the polyhydric alcohol may be employed, e.g., the alcohol produced as a by-product in the reaction. Similarly the cyclic mixed anhydrides of the present invention may be prepared by reacting one mole of a tetraalkyl zirconate with two moles of a dibasic carboxylic acid under anhydrous conditions. The reaction proceeds in the same manner as in the case of the polyhydroxy alcohols, so that for the purpose of this reaction the carboxylic acids may be regarded simply as a species of aliphatic polyhydroxy compound, the hydroxyl group in the carboxylic acid radical being equivalent to the alcoholic hydroxyl group. In each case, the reaction proceeds with the liberation of four moles of an alkyl alcohol, the identity of the alcohol liberated depending upon the tetraalkyl zirconate employed as a starting material. The alcohol thus formed as a by-product may be removed simply by distilling it off either at atmospheric pressure or at reduced pressure, thus causing the reaction to go essentially to completion. In a few cases the solubility of the desired product may be such that it precipitates from the reaction mixture, in which case filtration, centrifugation or decantation may suffice to remove the alcohol without the necessity for distillation. However, an insoluble product at this point is not necessarily the desired product of this invention. Under such circumstances, the insoluble precipitate may be converted to the desired product either by adding a solvent which forms an azeotrope with the by-product alcohol and heating to distill off four moles of the alcohol, or by simply heating to distill off the alcohol. The yield of the desired product usually approaches the theoretical, as indicated by the amount of by-product alcohol evolved. The cyclic esters may also be produced from the tetraalkyl zirconates by reaction with two moles of the mono- or poly-esters of the polyhydroxy alcohols, preferably esters of the lower fatty acids containing up to four carbon atoms, such as acetic, propionic, or butyric acid, in which case an alkyl ester of the fatty acid will be produced as a by-product, the alkyl group of the ester being derived from the tetraalkyl zirconate.

The monomeric compounds of the present invention possess the following structure in which A and $A_1$ indicate a group including a chain containing from two to three aliphatic carbon atoms directly connecting the oxygen atoms, a single zirconium atom replacing two hydroxyl hydrogen atoms in each of two molecules of polyhydroxy compound:

The reaction leading to the production of these new compounds may be represented as follows, where R is ethyl, propyl, butyl, etc.:

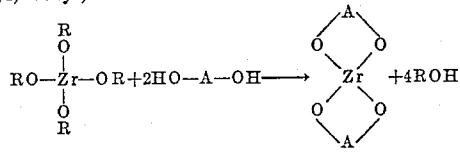

It has been found that the carbon chain indicated as A above must be from two to three carbon atoms long, attempts to produce analogous compounds in which chain A is either longer or shorter failing to produce the desired compound in more than minute quantities.

Among the tetraalkyl zirconates which may be employed as starting materials for the compounds of the present invention are tetraethyl zirconate, tetra-n-propyl zirconate, tetraisopropyl zirconate, tetra-n-butyl zirconate, tetraisobutyl zirconate, and tetra-tert-butyl zirconate. The tetraisopropyl zirconate in addition is available in the form of its monoisopropanolate and also in the form of an ammoniate. These compounds are referred to generically herein as "tetraalkyl zirconates." The four alkyl groups in such tetraalkyl zirconates need not be identical. Although analogous alkyl esters higher than the butyl esters may be employed as the starting material, longer chain alkyl esters are in general not so desirable because the higher molecular weight alcohols produced as by-products of the reaction, being less volatile, are more difficult to remove, making it more difficult to drive the reaction to completion except in those few cases in which the desired product is insoluble. Similar volatility considerations apply when an alkyl ester of a fatty acid is the by-product to be removed. In that case it is desirable to employ the ester of a lower fatty acid containing up to four carbon atoms such as acetic, propionic, or butyric acid.

The polyhydric alcohols or polyhydroxy aliphatic alcohols which may be employed as the starting material must have two hydroxyl groups separated by an aliphatic carbon chain from two to three carbon atoms long. However, each of the carbon atoms in the chain may have one or both of its hydrogen atoms substituted by a wide variety of groups, including aromatic groups and aliphatic groups containing up to as many as thirty carbon atoms or more, the properties of the resultant cyclic ester depending in part upon the nature of the substituent groups attached to the carbon chain. Among the available polyhydric alcohols which may be employed are ethylene glycol; phenylethanediol-1,2; propanediol-1,2; propanediol-1,3; butanediol-1,2; butanediol-1,3; butanediol-2,3; 3-butanediol-1,2; 2-methylpropanediol-1,2; pentanediol-1,2; pentanediol-2,3; pentanediol-2,4; 3-methylbutanediol-1,2; 2-methylbutanediol-2,3; 2-methylpentanediol-1,3; 2-methylpentanediol-2,4; 2,3-dimethylbutanediol-2,3; 1,5-hexadiene-3,4-diol; hexanediol-2,3; 2,2-diethylpropanediol-1,3; 2-propylheptanediol-1,3; 2-ethylhexanediol-1,3; 2-butylbutanediol-1,3; octanediol-4,5; 2-methyl-2-propylpropanediol-1,3; 2-butyl-2-ethylpropanediol-1,3; 3,4-diethylhexanediol-3,4; 2,3-diphenylbutanediol-2,3; 2,4-diphenylbutanediol-1,3; 2-amino-2-methylpropanediol-1,3; 2,2-dimethylpropanediol-1,3; 2-methyl-2-nitropropanediol-1,3; 2-ethyl-2-nitropropanediol-1,3; 3-chloropropanediol-1,2; dihydroxyacetone; hexanetriol-1,2,6; glycerol, glycerol-1-octadecylether, glycerol monoesters such as glycerol monoacetate, glycerol monolaurate, glycerol monostearate, glycerol monopalmitate, glycerol monooleate, glycerol monobenzoate. In addition, as pointed out above, mono- or poly-esters of the foregoing polyhydroxy materials with lower fatty acids may also be employed, such as the mono- and di-acetates of ethylene glycol, propanediol-1,2, propanediol-1,3, glycerol triacetate, etc.

The mixed anhydrides of the present invention may be prepared as indicated above in an analogous fashion from dibasic carboxylic acids such as oxalic or malonic acid or substituted malonic acids such as ethyl malonic, dimethyl malonic, butyl malonic, chloromalonic, benzyl malonic, and the like.

If desired, mixtures of any two or more of the foregoing polyhydroxy compounds or esters thereof may be employed, including mixtures of polyhydroxy alcohols such as 2-ethylhexanediol-1,3 with dibasic carboxylic acids such as oxalic acid, in which case the two rings present in the product may not be identical. However, it is essential that the ratio of the moles of tetraalkyl zirconate to the total moles of polyhydroxy compound in the mixture be 1:2 in order to produce the desired cyclic products. Obviously, in order to obtain a pure compound having two different rings, a mixture of only two polyhydroxy compounds should be employed, and the mole ratio of the three reactants should be 1:1:1.

Although the precise temperature at which the reaction is carried out is not critical, it is normally preferred to carry out the reaction at moderate temperatures, about 20° to 70° C. The alkanol or alkyl ester produced as a by-product may be removed by volatilization, either at atmospheric pressure or at reduced pressure; the reaction is complete when four moles of the alcohol or ester by-product have been distilled off. Although this procedure usually leads directly to a monomeric product, in some cases a low addition polymer may be formed containing up to five zirconium atoms on the average, or the product may be a mixture of monomeric compound and such addition polymer. These polymers are addition polymers having the same elemental analysis as the correponding monomeric compound. It is believed that the polymers are polycyclic compounds in which the zirconium atoms are bonded together by means of alkylene ether linkages, not by oxygen alone. These polymers normally are glassy solids and substantially more soluble in most organic solvents than the usual crystalline corresponding monomeric compounds.

Although the compounds of the present invention are more stable toward moisture, as indicated above, than are the previously known alkyl esters or orthozirconic acid, they nevertheless react both with water and with alcohols, either in solution or dispersed in a liquid medium which is a solvent for the reaction product. Accordingly, it will be seen that the compounds of the present invention are conveniently converted to esters, anhydrides, polymers, etc., of the type previously known and therefore provide a convenient source for such materials, the source material being readily purified and conveniently stored and handled or shipped.

In addition, the compounds of the present invention are useful as transesterification catalysts and as crosslinking agents for such materials as cellulose esters.

The following specific examples will serve to illustrate more clearly the nature of the invention and are not intended as limitations upon its scope.

*Example 1*

A. In a dry 40 ml. standard-taper flask was placed 3.87 g. (0.01 mole) of tetraisopropyl zirconate monoisopropanolate and 10 g. of dry benzene. After solution of the zirconate had been accomplished by swirling, there was added 2.92 g. (0.02 mole) of Octylene Glycol (2-ethylhexanediol-1,3). There was no substantial evolution of heat; the contents were well mixed by swirling, after which the flask was connected to a distillation apparatus and substantially 0.04 mole of isopropyl alcohol was distilled off under vacuum at a temperature of 50°–60° C. The contents were then heated in a vacuum desiccator and finally in a drying pistol at 1 mm. pressure and at 100° C., yielding 3.83 g. of a white solid product, within 2% of the theoretical yield.

Analysis.—Calculated for $C_{16}H_{32}O_4Zr$: C=50.63%; H=8.51%. Found: C=50.52%; 50.31%; H=8.24%; 8.45%.

The molecular weight of the product (modified Rast method) was found to be 490 (calculated molecular weight of monomer: 379), indicating that the product was a mixture of monomer and dimer.

B. The product prepared as described in A above was placed in a 40 ml. flask, 22 ml. of dry para-xylene was added, and the mixture was refluxed at 138° C. for 2¼ hours, after which it was filtered and washed with two portions of dry para-xylene. The insoluble residue, which consisted of monomeric material, weighed 2.69 g. after vacuum drying. The material did not melt when heated to 340° C. nor was there any evidence of decomposition. In this monomeric material a single zirconium atom replaces all four hydroxyl hydrogen atoms of two molecules of the diol.

The xylene solution upon evaporation yielded 1.09 g. of a yellow-colored glassy material which had a molecular weight (modified Rast method) of 759 (molecular weight calculated for addition dimer: 758). The relative quantities of monomer and dimer, as thus determined, supported and verified the average molecular weight of the mixture as described in part A above.

Example 2

A tetraisopropyl zirconate ammoniate was prepared by dissolving zirconium tetrachloride in excess anhydrous isopropanol, removing the precipitate which appeared upon standing, then passing in excess ammonia while heating the solution to reflux, again removing the precipitate, crystallizing the desired ammoniate from the solution, and drying the crystals over sulfuric acid at reduced pressure.

A solution containing 3.52 grams (0.01 mole) of the above ammoniate in 10 ml. of dry benzene was prepared, and to it was added 2.94 g. (0.02 mole) of dry 2-ethylhexanediol-1,3. The benzene and the alcohol by-product were removed by heating the reaction mixture to a temperature of 110° C. while reducing the pressure to 5 mm. mercury. The white solid product obtained was identical with the product of Example 1A except that it contained a smaller proportion of dimer.

Example 3

In 12 ml. of dry benzene contained in a dry 40 ml. flask there was dissolved by swirling 3.99 g. (0.0103 mole) of dry tetraisopropyl zirconate monoisopropanolate. To the solution was added 1.28 g. (0.0206 mole) of pure dry ethylene glycol. Finally there was added 10 ml. of dry isopropyl alcohol to product a homogeneous solution and the flask was attached to a vacuum distillation apparatus, the solvents being removed by distillation at a temperature of 110°–140° C. and at pressures which decreased ultimately to 1 mm. mercury.

The solid product was broken up, transferred to another container and heated in a vacuum pistol for 50 hours at 100° C. at 1 mm. mercury pressure. The white solid product thus obtained weighed 2.23 g. and was found to have a melting point (corr.) of 335° C. and to decompose at 340° C. It was insoluble in water and the ordinary organic solvents and possessed a molecular weight (modified Rast method) of 226±12 (calculated molecular weight of monomer: 211).

Analysis.—Calculated for $C_4H_8O_4Zr$: C=22.74%; H=3.81%. Found: C=22.50%; H=3.95%.

Example 4

In 12 ml. of dry benzene in a dry 40 ml. flask was dissolved 3.87 g. (0.01 mole) of tetraisopropyl zirconate monoisopropanolate and to the solution was added 1.84 g. (0.02 mole) of pure dry glycerol. There were added 10 ml. of dry isopropanol to provide a homogeneous solution. After standing for about ten minutes, the product began to appear in the form of a gel. The mixed solvents were removed by distillation at 105°–120° C. initially at atmospheric pressure and finally at reduced pressure. The solid product was heated in a vacuum pistol at 100° C. for 48 hours at 1 mm. mercury pressure. The resultant white product was insoluble in most common solvents, weighed 2.78 g., and was found to have no melting point, but decomposed at 250° C. The molecular weight of the product (freezing point depression in 2,2-dimethylpropanediol-1,3) was found to be 272±30 (calculated molecular weight of monomer: 271).

Analysis.—Calculated for $C_6H_{12}O_6Zr$: C=26.55%; H=4.47%. Found: C=26.18%; H=4.71%.

Example 5

The procedure described in Example 4 was repeated replacing the glycerol with 1.80 g. (0.02 mole) of optically inactive, pure, dry, redistilled butanediol-2,3. No isopropanol was required to provide a homogeneous solution. The product obtained was heated in a vacuum pistol for 48 hours at a temperature of 100° C. and at a pressure of 1 mm. mercury. The white solid product weighed 3.07 g. and was found to decompose upon heating to about 300° C. The molecular weight (modified Rast method) was found to be 268 (calculated molecular weight of monomer: 267).

Analysis.—Calculated for $C_8H_{16}O_4Zr$: C=35.93%; H=6.03%; Zr=34.11%. Found: C=35.44%; H=6.29%; Zr=34.58%.

Example 6

The procedure of Example 5 was repeated except that the butanediol-2,3 was replaced by 2.36 g. (0.02 mole) of 2-methylpentanediol-2,4.

The weight of the white solid product was 3.44 g., melting point 177°–178° C. (corr.). The molecular weight (modified Rast method) was found to be 324 (calculated molecular weight of monomer: 324).

Analysis.—Calculated for $C_{12}H_{24}O_4Zr$: C=44.35%; H=7.48%. Found: C=44.14%; H=7.29%.

Example 7

The procedure of Example 5 was repeated except that the butanediol-2,3 was replaced by 3.20 g. (0.02 mole) of 2-butyl-2-ethylpropanediol-1,3.

The white solid product obtained after distilling off the solvents at a maximum temperature of 150° C. at a pressure of 1 mm. mercury weighed 4.16 g. after drying in a vacuum pistol for 14 hours at 100° C. The product melted at 326°–327° C. (corr.) and decomposed at 330°–335° C. (corr.). The molecular weight was found (modified Rast method) to be 405 (calculated molecular weight of monomer: 408).

Analysis.—Calculated for $C_{18}H_{36}O_4Zr$: C=53.03%; H=8.90%. Found: C=52.83%; H=8.68%.

Example 8

The procedure of Example 5 was repeated except that the butanediol-2,3 was replaced by 2.76 g. (0.02 mole) of phenyl-1,2-ethanediol (M.P. 64.5°–65.5° C., corr.). In this case the addition of 10 ml. of dry ethyl ether was required to obtain a homogeneous solution.

The white solid product obtained after vacuum distillation of the solvents was heated in a drying pistol at 100° C. for 14 hours at a pressure of 1 mm.

The product weighed 4.24 g. and was found not to melt, but to decompose at 200°–215° C. This product was slightly soluble in benzene, but insoluble in most other ordinary solvents.

*Analysis.*—Calculated for $C_{16}H_{16}O_4Zr$: C=52.79%; H=4.43%; Zr=25.19%. Found: C=52.58%; H=4.23%; Zr=25.49%.

Example 9

Into a solution of 3.88 g. (0.01 mole) of tetraisopropyl zirconate monoisopropanolate in 10 ml. of dry benzene contained in a dry 40 ml. flask there was mixed a solution of 1.80 g. (0.02 mole) of anhydrous oxalic acid in 10 ml. of dry isopropanol. An adidtional 8 ml. of dry isopropanol was used to rinse the oxalic acid solution into the reaction vessel. Upon mixing of the reagents an immediate precipitate formed with the evolution of heat. After thorough mixing the flask was connected to a vacuum distillation apparatus and the solvents were removed by heating to a maximum temperature of 110° C. at a minimum pressure of 1 mm. mercury. The product was found to occlude solvent and it was necessary to break up the solid and mix it with 10 ml. of dry chloroform, then evaporate off the chloroform at atmospheric pressure by heating at approximately 80° C. The resulting product still contained a small quantity of solvent, but it could readily be removed by heating at reduced pressure as in a drying pistol at a pressure of 1 mm. mercury and a temperature of 78° C. for 48 hours. The white solid product obtained weighed 2.72 g. and decomposed without melting at 200°–220° C. It was insoluble in all ordinary organic solvents except bromoform (sparingly soluble) and decomposed on contact with water. Molecular weight was estimated as 300 (freezing point depression in bromoform) while the molecular weight calculated for the monomer was 267.

*Analysis.*—Calculated for $C_4O_8Zr$: C=17.98%; Zr=34.13%. Found: C=17.77%; Zr=34.48%.

Example 10

The procedure in this example was the same as that described in Example 5 except that the butanediol-2,3 was replaced by 2.36 g. (0.02 mole) of pure anhydrous pinacol or 2,3-dimethylbutanediol-2,3 (B.P. 171°–172° C.) dissolved in 10 ml. of dry benzene. The white solid product after heating in a drying pistol for 14 hours at 100° C. and a pressure of 1 mm. weighed 3.39 g. and was found to decompose without melting at 275°–295° C. (corr.). The product was soluble in a variety of organic solvents such as benzene, chloroform and ethanol. The molecular weight of the product was 1030±100 (estimated from freezing point depression in bromoform) (calculated molecular weight of trimer: 975).

*Analysis.*—Calculated for $C_{12}H_{24}O_4Zr$: C=44.48%; H = 7.47%; Zr = 28.30%. Found: C = 43.24%; H=7.94%; Zr=27.95%.

Example 11

Into a 40 ml. flask containing a solution of 3.88 g. (0.01 mole) of dry tetraisopropyl zirconate monoisopropanolate in 10 ml. of dry benzene there was introduced a solution of 2.21 g. (0.02 mole) of 3-chloropropanediol-1,2 in 10 ml. of dry isopropyl alcohol. After thorough mixing, the solvents were removed by heating to a maximum temperature of 120° C. at a minimum pressure of 1 mm. mercury. The product after heating for 14 hours at 100° C. and at a pressure of 1 mm. weighed 3.12 g. and decomposed at 270°–285° C. (corr.) without melting.

*Analysis.*—Calculated for $C_6H_{10}Cl_2O_4Zr$: C=23.34%; H = 3.26% Cl = 22.97%; Zr = 29.70%. Found: C=22.88%; H=3.02%; Cl=22.74%; Zr=29.44%.

Example 12

The procedure of the preceding Example 11 was repeated, replacing the solution of 3-chloropropanediol-1,2 with a solution of 2.10 g. (0.02 mole) of recrystallized 2-amino-2-methylpropanediol-1,3 in 10 ml. of dry isopropyl alcohol. An additional 10 ml. of this alcohol was employed to rinse the solution into the reaction vessel. The white solid product weighed 3.31 g. and appeared to be stable without either decomposing or melting when heated to temperatures up to 335° C.

*Analysis.*—Calculated for $C_8H_{18}O_4N_2Zr$: C=32.31%; H = 6.10%; N = 9.42%; Zr = 30.67%. Found: C=31.89%; H=5.86%; N=9.29%; Zr=30.98%.

Example 13

A solution containing 3.88 g. (0.01 mole) of dry tetraisopropyl zirconate monoisopropanolate in 14 ml. of dry benzene was introduced into a dry 40 ml. flask. A solution of 2.98 g. (0.02 mole) of 2-ethyl-2-nitropropanediol-1,3 (M.P. 56°–57° C.) in 17 ml. of dry diethyl ether was introduced into the reaction flask followed by 16 ml. of additional diethyl ether. The solvent was removed from the reaction mixture by heating initially at atmospheric pressure and finally at reduced pressure at a temperature of 90° C. Residual solvent was eliminated by cooling the product, adding 10 ml. of dry benzene, then again heating initially at room temperature and finally at pressures as low as 1 mm. mercury and at a temperature of 140° C. The white solid product, after heating for 14 hours in a drying pistol at a temperature of 100° C. and at a pressure of 1 mm. mercury, weighed 3.93 g. and decomposed without melting at 200°–220° C.

*Analysis.*—Calculated for $C_{10}H_{18}N_2O_8Zr$: C=31.11%; H = 4.70%; N = 7.26%; Zr = 23.76%. Found C=30.84%; H=4.56%; N=7.12%; Zr=24.12%.

Example 14

There was dissolved in 10 ml. of dry benzene in a dry 40 ml. flask 3.88 g. (0.01 mole) of dry tetraisopropyl zirconate monoisopropanolate. With this solution there was mixed 1.46 g. (0.01 mole) of 2-ethylhexanediol-1,3. After mixing of the reagents there was added to the mixture a solution containing 0.90 g. (0.01 mole) of anhydrous oxalic acid in dry isopropyl alcohol. Upon mixing of the solutions an immediate precipitate appeared. The reaction mixture was heated initially at atmospheric pressure to remove volatile products. In order to ensure complete reaction of the oxalic acid, there was added to the solid reaction mixture an additional 30 ml. of dry isopropyl alcohol which resulted in a clear solution. This solvent was removed by heating at atmospheric pressure and the foregoing procedure was repeated twice using 10 ml. of dry benzene each time. The white solid product was heated in a drying pistol for 72 hours at a pressure of 1 mm. and a temperature of 100° C. The product so obtained weighed 3.55 g. and decomposed without melting at 270–335° C. after preliminary charring at 205°–215° C. The molecular weight was found (freezing point depression in bromoform) to be 320±40 (calculated molecular weight for monomer: 324).

*Analysis.*—Calculated for $C_{10}H_{16}O_6Zr$: C=37.14%; H=4.98%; Zr=28.20%. Found: C=36.78%; H=4.84%; Zr=28.56%.

Example 15

The product prepared as described in Example 1 above was utilized as a transesterification catalyst in the following procedure. To a mixture of 89.5 g. of methyl stearate with 101.3 g. of Abitol, a high molecular weight alcohol containing a sterically hindered hydroxyl group, prepared by reduction of abietic acid, there was added 3.8 g. of the monomeric product described in Example 1B above. The mixture was then heated at 170°–210°

C. for about 4½ hours at a pressure of 4–8 mm. mercury, during which time 11.2 ml. of methyl alcohol distilled off (theoretical maximum for complete reaction, 12.0 ml.).

The same mixture of methyl stearate and Abitol, containing no zirconium compound, when heated under identical conditions yielded only 2.5 ml. of methyl alcohol, showing plainly the high effectiveness of the compound of the present invention as a transesterification catalyst.

Similar results could be obtained with other compounds of the present invention.

*Example 16*

Ten parts by volume of a 10% (by weight) solution of commercial cellulose acetate dissolved in acetone was diluted with 20 parts by volume of chloroform. To one-half of the solution was added 5 parts by volume of a chloroform solution containing approximately 10% by weight of the mixed monomer-dimer product of Example 1A above. Gelation occurred immediately upon mixing.

Samples of the solution to which the product of the present invention had been added and of the untreated solution were then dried in air at 110° C. The dry residue from the untreated sample readily redissolved completely in acetone, whereas approximately 70% by weight of the dry residue from the treated sample remained completely insoluble in acetone even after 72 hours' contact.

Similarly, other products of the present invention were found to be effective as cross-linking or insolubilizing agents for cellulose acetate, cellulose nitrate, or other cellulose esters.

Although specific embodiments of the invention have been described herein, it is not intended to limit the invention solely thereto, but to include all of the obvious variations and modifications within the spirit and scope of the appended claims.

I claim:

1. An organo-metallic cyclic zirconium compound containing at least two heterocyclic rings and having from one to five zirconium atoms in the molecule, each zirconium atom forming a part of two adjacent rings, each ring consisting, in addition to zirconium, of

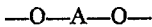

groups in which each oxygen atom is bonded directly to zirconium by a primary valence bond and A is a group containing only from two to three aliphatic carbon atoms in the chain connecting the oxygen atoms, the number of —O—A—O— groups in the molecule being twice the number of zirconium atoms.

2. A monomeric cyclic organo-metallic zirconium compound having two rings joined by a zirconium atom common to both rings, each ring containing from five to six atoms of which the two adjacent to the zirconium are oxygen atoms bonded by primary valence bonds to the zirconium and all the remaining atoms of the ring are aliphatic carbon atoms.

3. An addition homopolymer of the monomeric compound defined in claim 2, the average degree of polymerization of said polymer being no greater than five.

4. A monomeric organo-metallic cyclic zirconium ester of a polyhydroxy aliphatic alcohol, said ester having two rings joined by a zirconium atom common to both rings, each ring containing from five to six atoms in a chain of which the two adjacent to the zirconium are oxygen atoms bonded by primary valence bonds to the zirconium and all the remaining atoms of the chain are aliphatic carbon atoms.

5. An addition homopolymer of the monomeric compound defined in claim 4, the average degree of polymerization of said polymer being no greater than five.

6. An organo-metallic cyclic zirconium mixed anhydride-ester compound, said compound having at least two heterocyclic rings and having from one to five zirconium atoms in the molecule, each zirconium atom forming a part of two adjacent rings, one of said adjacent rings consisting, in addition to zirconium, of a dicarboxylic acid residue having the structure

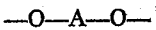

in which each oxygen atom is bonded directly to zirconium by a primary valence bond and A is a group containing only from two to three aliphatic carbon atoms in the chain connecting the oxygen atoms, the other of said adjacent rings consisting, in addition to zirconium, of a dihydroxy alcohol residue having the structure —O—A'—O— in which each oxygen atom is bonded directly to zirconium by a primary valence bond, and A' is a group containing only from two to three aliphatic carbon atoms in the chain connecting the oxygen atoms, the total number of said rings in the molecule being twice the number of zirconium atoms.

7. An organo-metallic cyclic zirconium ester of 2-ethylhexanediol-1,3 in which all four hydroxyl hydrogen atoms of two molecules of said diol are replaced by a single zirconium atom.

8. An addition homopolymer dimer of the ester defined in claim 7.

9. An organo-metallic cyclic zirconium ester of 2-amino-2-methylpropanediol-1,3 in which all four hydroxyl hydrogen atoms of two molecules of said diol are replaced by a single zirconium atom.

10. An organo-metallic cyclic zirconium mixed anhydride-ester of oxalic acid and 2-ethylhexanediol-1,3 in which a single zirconium atom replaces both carboxyl hydrogen atoms of one molecule of said acid and both hydroxyl hydrogen atoms of one molecule of said diol.

11. An organo-metallic cyclic zirconium ester of butanediol-2,3 in which all four hydroxyl hydrogen atoms of two molecules of said diol are replaced by a single zirconium atom.

12. The method of making cyclic organo-metallic zirconium compounds which comprises reacting under anhydrous conditions one molecular proportion of a lower tetraalkyl zirconate with two molecular proportions of an organic compound containing only two reactive groups connected to an aliphatic carbon chain in which said groups are spaced apart by two to three chain carbon atoms, the carbon atoms of said chain being bonded directly to each other, said reactive groups being selected from the class consisting of hydroxy groups and esters of such groups with lower aliphatic carboxylic acids, and separating from the reaction mixture substantially four molecular proportions of a by-product selected from the class consisting of alkanol and an alkyl ester of said carboxylic acid.

13. The method of claim 12 in which said tetraalkyl zirconate is tetraisopropyl zirconate monoisopropanolate.

14. The method of claim 12 in which said tetraalkyl zirconate is tetraisopropyl zirconate ammoniate.

15. The method of making cyclic organo-metallic zirconium esters which comprises reacting under anhydrous conditions one molecular proportion of a lower tetraalkyl zirconate with two molecular proportions of a polyhydric aliphatic alcohol containing only two hydroxyl groups connected by a chain of two to three carbon atoms, and separating from the reaction mixture substantially four molecular proportions of by-product alkanol.

16. The method of making cyclic organo-metallic zirconium compounds which comprises reacting under anhydrous conditions one molecular proportion of a lower tetraalkyl zirconate with one molecular proportion of a polyhydric aliphatic alcohol containing only two hydroxyl groups connected by a chain of two to three carbon atoms and with one molecular proportion of an aliphatic polycarboxylic organic acid containing only two acidic hydroxyl groups connected by a chain of two to three carbon atoms, and separating from the reaction mixture substantially four molecular proportions of by-product alkanol.

17. The method of making cyclic organo-metallic zirconium compounds which comprises reacting under anhydrous conditions in a volatile solvent inert to the reactants one molecular proportion of a lower tetraalkyl zirconate with two molecular proportions of a compound containing only two hydroxyl groups connected to an aliphatic carbon chain in which said groups are spaced apart by two to three chain carbon atoms, the carbon atoms of said chain being bonded directly to each other, and separating from the reaction mixture by distillation said solvent together with substantially four molecular proportions of by-product alkanol.

References Cited in the file of this patent

UNITED STATES PATENTS

| | | |
|---|---|---|
| 2,643,262 | Bostwick | June 23, 1953 |
| 2,684,972 | Haslam | July 27, 1954 |
| 2,795,553 | Lowe | June 11, 1957 |
| 2,824,115 | Beacham et al. | Feb. 18, 1958 |

OTHER REFERENCES

Mattock: J. Chem. Soc. (London), pp. 989–997, March 1954.